Nov. 26, 1968    H. A. ADAMS ET AL    3,413,151

ROD AND BLOCK ENERGY STORAGE APPARATUS

Filed Feb. 7, 1966

INVENTORS
HARRY A. ADAMS
ROMAN ZORSKA

BY  Kramer & Sturges

ATTORNEYS

United States Patent Office 3,413,151
Patented Nov. 26, 1968

3,413,151
ROD AND BLOCK ENERGY STORAGE
APPARATUS
Harry A. Adams, Bedford, and Roman Zorska, Cleveland, Ohio, assignors to The Standard Oil Company, Cleveland, Ohio, a corporation of Ohio
Filed Feb. 7, 1966, Ser. No. 525,559
6 Claims. (Cl. 136—83)

ABSTRACT OF THE DISCLOSURE

An electrical energy storage device operable above the fusion point of the electrolyte. The device employs a plurality of negative electrode rods mounted in channels formed in a massive block positive electrode. The rods are disposed in spaced relation from the block. The electrolyte fills these voids or spaces and contacts the electrodes. A pair of eternally accessible electrical connections in conductive communication with the positive and negative electrodes, are also provided.

---

This invention relates to an electrical energy storage device, and more particularly, to a novel cell configuration of an electrical energy storage device.

Although it is known that cell configuration is a factor in the electrical capacity of an electric energy storage device comprising a pair of opposed electrodes and an electrolyte, research and development work, thus far, primarily has emphasized the composition of the electrodes and composition of the electrolyte and their preparation, while very little research and development work has been directed toward the configuration of an energy storage device, so as to maximize the energy output of the device.

It is therefore a general object of the present invention to provide an improved electrical energy storage device of improved configuration.

It is another object of the invention to provide an energy storage device which offers the advantages of reduced bulk and high energy storage.

These and other objects of the present invention become more apparent to those skilled in the art from the following detailed description and drawings in which.

Figure 2:
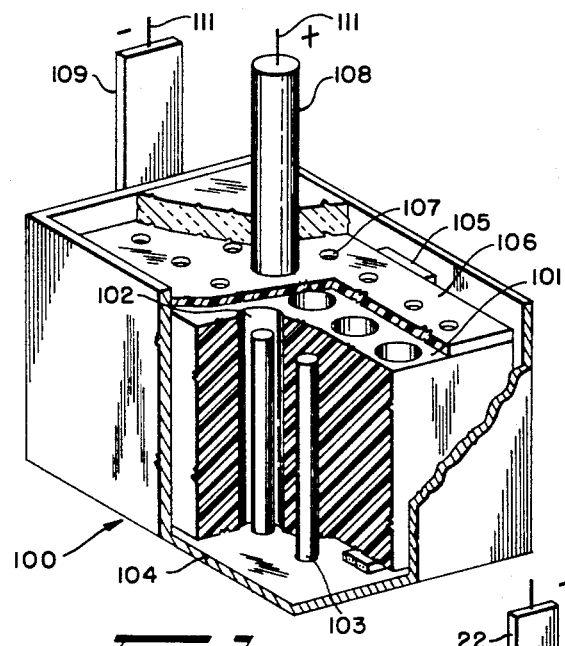
FIG. 2 is a cut-away perspective view of a rod and block electrical energy storage device of rectangular cross section.
Figure 4:
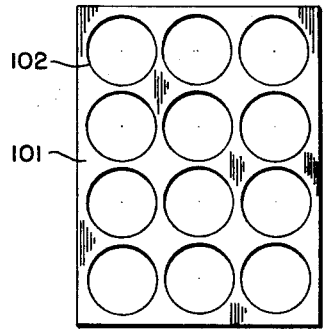
FIG. 4 is a top plan view of the block electrode of the electrical energy storage device of FIG. 2.

Accordingly, it has been discovered that a rod and block electrode configuration, as illustrated in the drawings, and described herein, produces improved packing efficiency and higher capacity per unit volume of cell. An electric energy storage device designed, as herein outlined, has been found to be superior to similar devices comprising other electrode configurations, but with the same composition of electrodes and electrolyte.

The block of the rod and block configuration effectively serves as the positive electrode of an electric energy storage device and circumscribes a close-packed array of negative electrodes (rods) without having any of the mass or block (i.e. the positive electrode) at too great a distance from the negative electrode surface. The negative electrode is the rod of the rod and block configuration of this invention. The rod and block configuration demonstrates higher packing efficiencies, energy storage and capacity than that known in the prior art.

Figure 1:
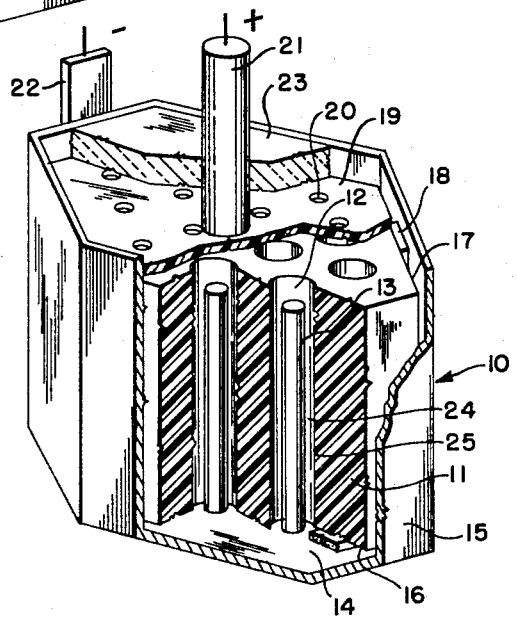
FIG. 1 is a cut-away perspective view of a rod and block electrical energy storage device of hexagonal cross section.
Figure 3:
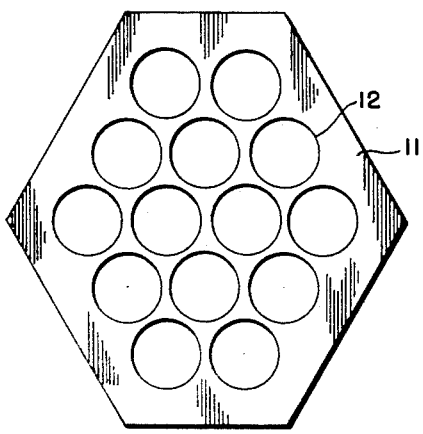
FIG. 3 is a top plan view of the block electrode of the electrical energy storage device of FIG. 1.

An electrical energy storage device 10 comprising a carbon block of a hexagonal design is illustrated in FIG. 1. The carbon block of the electrical energy storage device is an octahedron of uniform, horizontal, hexagonal cross section. The geometric solid thus defined is a massive block 11, most commonly composed of carbon and serving as a positive electrode. Extending from the uppermost surface to the lowermost surface of the block are hollow cylindrical channels 12.

The diameters and positioning of the channels 12 are selected to provide the most efficient configuration, as described in more detail hereinafter.

Centered in the cylindrical channels 12 are negative electrodes 13. Electrodes 13 are maintained centered in the cylindrical channels 12, by a firm conductive connection (not shown) to the inside of the bottom 14 of a container 15, the corresponding surfaces of which container are juxtapositioned in spaced relationship and parallel to the bottom 16 and side walls 17 of the block 11.

The container 15 is electrically insulated from the carbon block 11 by means of insulating material 18 (e.g. thoria, silica) interposed between the side walls 17 and bottom 16 of the block 11, and container 15. Any good insulating material which is stable to a molten, alkali halide electrolyte can be utilized.

Cemented to the uppermost surface of block 11 is a graphite header 19. Graphite header 19 is provided with openings 20 communicating with the uppermost portion of the cell to allow equilibration of electrolyte level during operation of the device. Connected to the header 19 is a current conductor 21 leading away from the header. Also leading away from the container 15 is current conductor 22, welded to the container 15. External connections can be made to the device by means of the current conductors 21 and 22. Neither the size, nor the specific composition of the current conductor and header are important and each may be altered to conform to the design requirements of the particular energy storage device used. The entire device is insulated by top 23 on the top side and bottom. The side and bottom insulation is not shown.

The block 11 is fabricated of any electrode composition material that has been shown to be suitable to form an effective positive electrode in an energy storage device, as for example activated carbon. Active carbon is generally prepared in a two-step process comprising formation of a porous, amorphous base carbon at a relatively low temperature, followed by the removal of adsorbed hydrocarbons from the primary carbon, thereby increasing the porosity. Step one involves distillation at a relatively low temperature.

Step two involves the removal of the adsorbed hydrocarbons by combined oxidation and distillation, involving steam alone, or steam and air; the hydrocarbons of high boiling points are broken down into more volatile substances easily removed at low temperatures and under conditions less likely to result in the deposition of secondary carbon, which is inactive. During the removal by oxidation and distillation of the hydrocarbons, a loss of primary carbon by oxidation occurs; the conditions of activation must, therefore, be so chosen that the hydrocarbons are oxidized rapidly, the primary carbon slowly.

In the steam-activation process, the carbon from step one is placed in an upright steel tube with top feed and bottom discharge. Superheated steam enters and streams downward through the carbon, carrying away the undesired hydrocarbons before they can be decomposed by the high temperature and deposit inactive carbon. In step two, by both methods, the temperature is maintained at about 350° C. to 450° C.

The negative electrodes 13 are illustrated to be aluminum alloys, but any other negative electrode material, as for example carbon, can be utilized.

The annular space 24 between the negative electrodes 13 and the walls 25 of the hollow cylindrical channels 12 contains an electrolyte which comprises a source of mobile ions, free to move in the medium. It is contemplated by the present invention that the ion-containing and conducting medium be a melt at temperatures in the range of about 350° C.–600° C. and be derived from crystalline materials characterized by a predominantly ionic lattice when in the crystalline state at ambient temperatures and can be disassociated to provide the requisite ion content and mobility in the molten state. Mixtures of such media can be used.

Typical examples of materials which can be used are salts of metals. A particularly useful electrolyte is a molten salt comprising LiCl–KCl. Other electrolytes can be used, as, for example NaCl–AlCl$_3$ and LiBr–KBr.

Any suitable means can be provided for heating the above-mentioned electrolytes to maintain them in a molten state. For example, a Nichrome wire or tape-heating element can be wrapped around the container and utilized for heating the electrolyte.

The hexagonal metallic container 15 is fabricated of any metal such as iron, stainless steel or nickel which is inert to the electrolyte and which demonstrates good electrical conductivity.

The rod and block need not be of a hexagonal configuration but can be of other configurations, as for example, rectangular. A rectangular rod and block electric energy storage device 100 is illustrated in FIG. 2. The rectangular rod and block is a hexahedron of uniform, horizontal, rectangular cross-section. Hollow cylindrical channels 102, extend through block 101 from the uppermost surface to the lowermost surface. The channels are so positioned in the block as to afford a maximum amount of electrode composition (e.g. carbon) packing. It has been found that by maximizing the packing efficiency the total capacity of the device can also be maximized.

Centered in the channels 102 are negative electrode rods 103, fixedly attached to the bottom of a container 104, which container circumscribes the block 101 which is electrically insulated from the container by insulating material 105. The container is of a composition that is stable in the environment of an electrolyte.

Interpositioned between the walls and bottom of the container 104 and the block 101 is the insulating material. Any good insulating material, stable to a molten alkali halide electrolyte can be utilized. Cemented to the block 101 is a graphite header plate 106. Openings 107 in the graphite header allow equilibration of electrolyte level during operation of the cell. Connected to the graphite header, and leading from the device, is current conductor 108. Also leading away from the device is current conductor 109, attached to the container, which it is to be remembered, is in electrical communication with the negative electrodes.

External circuitry leads 111 can be connected to the device through the current conductors 108 and 109. The block 101 and the rods 103 can be constructed of any material suitable for use as a positive and negative electrode, as for example, activated carbon, as described hereinafter. The annular spaces between the negative electrode rods 103 and the walls of the hollow cylindrical channels contain electrolyte.

It has been found that by use of the novel electrode configuration of the storage device of the present invention with its rod and block electrode configuration, the energy output of an electrical energy storage device can be considerably improved. Tests have shown that a substantial increase in output can be expected.

The table, following, illustrates, for present practical cells, a comparison of various electrode configurations of an electrical energy storage device. The plate and frame A configuration can be described as a conventional design. The electrodes are suspended vertically in a container of rectangular shape. The vertical header B is similar to the plate and frame, except that the plate electrodes are rotated 90 degrees from the vertical plane so that they are on a horizontal plane. The rod and block C and the rod and block of a hexagonal design D are as aforedescribed.

The total volume of the electrode used is as shown. The electrodes tested were all carbon-positive electrodes, and aluminum-lithium alloy negative electrodes. The electrolyte in each case was a lithium chloride-potassium chloride eutectic. The figures for the total cell volume include electrodes and electrolyte.

Carbon packing efficiency is total carbon volume divided by total cell volume times 100 for a given ratio of cathode volume to anode volume. For a given ratio of cathode volume to anode volume, as can be seen from the table, the rod and block electrode configuration provide the highest packing efficiencies, the rod and block configuration providing over 35 percent greater packing efficiency over the lowest plate and frame packing efficiency. There is an optimum ratio of cathode volume to anode volume for any particular composition of the electrodes. This ratio in combination with the packing efficiency determines the overall capacity of the cell, as is evidenced by the last column of the table. Here it is seen that the rod and block configuration provides over 40 per cent more capacity than a plate and frame configuration as found in a conventional lead-acid storage battery.

TABLE

| Cell* | Volume (in.³) | | | Percent carbon packed | Vol. ratio- $V_{Cathode}/V_{Anode}$ | Capacity (amp-hours) | Amp-hours/ in.³ cell |
| --- | --- | --- | --- | --- | --- | --- | --- |
| | Cathode | Anode | Cell, total vol. | | | | |
| (A) Plate and frame | 13.5 | 1.8 | 35.2 | 38.4 | 7.5 | 27 | .77 |
| | 20.0 | 3.2 | 50.6 | 39.5 | 6.2 | 40 | .79 |
| (B) Vertical header (plate and frame) | 21.6 | 3.2 | 61.6 | 35.4 | 6.8 | 43 | .70 |
| (C) Rod and block (rectangular) | 20.9 | 4.0 | 49.0 | 55.0 | 6.8 | 53.8 | 1.1 |
| (D) Rod and block (hexagonal) | 27.7 | 4.6 | 50.2 | 55.5 | 6.0 | 55.4 | 1.1 |

*All figures are based on ⅛ inch interelectrode distance.

Having described the invention, the following subject matter is claimed.

What is claimed is:

1. An electrical energy storage device comprising:
   (a) a container;
   (b) a massive conductive block supported in the container and insulated therefrom; said block being a first electrode and substantially filling the container;
   (c) a plurality of hollow cylindrical channels extending at least into the interior of the block from an outer surface thereof;
   (d) a counter electrode fixedly centered in each of the hollow cylindrical channels in spaced relation from the block, an annular space being formed around the counter electrode;
   (e) an externally accessible electrical connection in conductive communication with said block;
   (f) a separate externally accessible electrical connection in conductive communication with said counter electrodes; and
   (g) an electrolyte substantially filling the annular space and contacting the electrodes, said storage device being responsive to an external electrical resistance load placed across the electrodes.

2. The electric storage device of claim 1 wherein the counter electrode comprises an aluminum-lithium alloy.

3. The electric storage device of claim 2 wherein the conductive block comprises activated carbon.

4. The electric storage device of claim 3 wherein the container comprises stainless steel and the electrolyte comprises a potassium chloride-lithium chloride eutectic mixture.

5. The electric storage device of claim 4 wherein the conductive block is an octahedron of uniform, horizontal, hexagonal cross-section.

6. The electric storage device of claim 4 wherein the conductive block is a hexahedron of uniform, horizontal, rectangular cross-section.

No references cited.

WINSTON A. DOUGLAS, *Primary Examiner.*

A. SKAPARS, *Assistant Examiner.*